United States Patent [19]

Takeda

[11] Patent Number: 5,147,944
[45] Date of Patent: Sep. 15, 1992

[54] POLYAMIDE RESIN, AND POLYAMIDE RESIN COMPOSITIONS

[75] Inventor: Yuji Takeda, Austin, Tex.

[73] Assignee: Mitsubishi Gas Chemical Company, Inc., Tokyo, Japan

[21] Appl. No.: 596,913

[22] Filed: Oct. 16, 1990

[51] Int. Cl.$^5$ ............................................. C08L 77/00
[52] U.S. Cl. ..................................... 525/432; 525/92
[58] Field of Search ............................... 525/432, 92

[56] References Cited

U.S. PATENT DOCUMENTS

| | | | |
|---|---|---|---|
| 4,849,471 | 7/1989 | Saito et al. | 525/66 |
| 4,863,996 | 9/1989 | Nakazima et al. | 525/92 |
| 4,885,340 | 12/1989 | Hamada et al. | 525/432 |
| 4,980,407 | 12/1990 | Okumoto et al. | 525/432 |
| 4,996,264 | 2/1991 | Aonuma et al. | 525/179 |
| 5,006,601 | 4/1991 | Lutz et al. | 525/92 |

OTHER PUBLICATIONS

Mitsubishi Gas Chem. Co., Patent Abstracts of Japan, vol. 14, No. 37 Jan. 24, 1990 JP-A-01 272 662.

Seifforth et al., Chemical Abstracts, vol. 89, 1978 Nov. 27, 1978, p. 3, Abstract No. 180411d.

*Primary Examiner*—Paul R. Michl
*Assistant Examiner*—Edward J. Cain
*Attorney, Agent, or Firm*—Wenderoth, Lind & Ponack

[57] ABSTRACT

A polyamide resin which comprises a molten reaction mixture composed of 10–90% by weight of a polyamide (A1) from xylylenediamine and a $C_6$–$C_{20}$ $\alpha,\beta$-linear aliphatic dibasic acid and 90–10% by weight of polyamide-6 (A2). The polyamide resin has either a single glass transition temperature differing from that of both (A1) and (A2), or two glass transition temperatures both differing from those of (A1) and (A2), the difference between the two temperatures being less than 10° C. There are also provided a toughened polyamide resin composition comprising (A) 100 parts by weight of the polyamide resin, and (B) 5 to 80 parts by weight of an elastomer such as one composed mainly of a block-copolymerized elastomer which has been modified with an unsaturated dicarboxylic acid or a derivative thereof and hydrogenated.

24 Claims, 3 Drawing Sheets

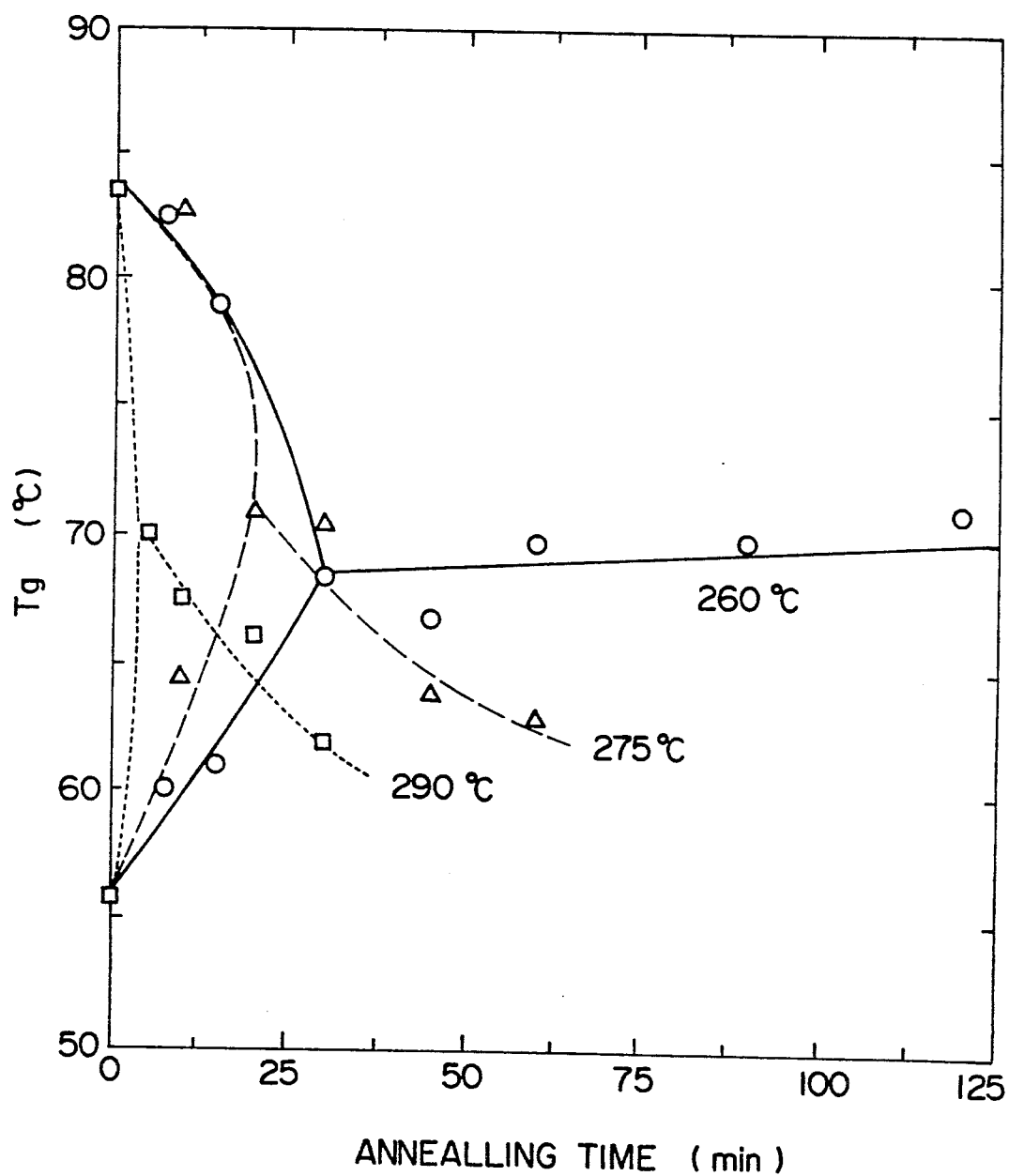

POLYAMIDE RESIN, AND POLYAMIDE RESIN COMPOSITIONS

TECHNICAL FIELD OF THE INVENTION

This invention relates to a novel polyamide resin formed by melt-kneading a polyamide resin mixture consisting of polyamide-6 and a polyamide resin composed of xylylenediamine and α,ω-linear aliphatic dibasic acid to perform a reaction so that the polyamide resin comes to have a glass transition temperature or temperatures within a certain range; and also a novel polyamide resin composition for molding, which is formed by blending said polyamide resin with a specific elastomer.

More particularly, the invention relates to a polyamide resin composition for molding excelling in such physical properties as impact strength, mechanical strength, modulus, chemical resistance and processing stability and being suitable for automotive, electric and electronic usages.

BACKGROUND OF THE INVENTION

Polyamide resins composed of xylylenediamine and $C_6$–$C_{20}$ α,ω-linear aliphatic dibasic acids (hereinafter will be referred to as "MX nylon") possess excellent chemical resistance, tensile strength and modulus of elasticity, but have low impact strength and are apt to cause brittle fracture at normal temperatures. Due to this defect little industrial value has been found in use of MX nylon alone.

Again polyamides such as polyamide-6, polyamide-66 and the like are short of impact strength if used by themselves, and various proposals have been made to improve that property.

On the other hand, as a means for improving impact strength of these polyamide resins, a resin obtained by simply blending MX nylon with above polyamide, especially a blend resin prepared by melting and kneading these polyamide resins at the extrusion temperature conditions employed in an ordinary molding machine, was made the subject of a patent application (U.S. patent application Ser. No. 525,598).

However, MX nylon and polyamide-6 are essentially scanty of compatibility with each other, and it is impossible to obtain molded articles of high mechanical strength from such simple blends.

Attempts to blend a specific elastomer with a polyamide resin have also been made.

British Patent 998,439 discloses a thermoplastic resin composition composed of 50–99% by weight of a linear polyamide and 50–1% by weight of an olefin copolymer particles, said olefin copolymer containing 0.1–10 mol % of an acid group(s).

U.S. Pat. No. 3,845,163 shows a resin composition which is an ionic copolymer formed by blending a polyamide with an α-olefin/α,β-ethylenically unsaturated carboxylic acid copolymer with the view to improve toughness of the molded articles, at least 10% of the acid group of said α,β-ethylenically unsaturated carboxylic acid being neutralized with a metallic ion(s).

The compositions disclosed in these patents, however, are still insufficient as to impact strength. Thus heretofore no attempts to improve the impact strength were made to blend MX nylon, which especially has low hygroscopicity and exhibits excellent dimensional stability after molding, with other polyamide resin to form a polymer alloy.

The main object of the present invention therefore resides in the provision of a polyamide resin for molding, which is free of above-described defects and exhibits excellent performance in impact resistance, mechanical strength, dimensional stability, chemical resistance and processability, and also in the provision of a polyamide resin composition formed by blending the polyamide resin with an elastomer.

SUMMARY OF THE INVENTION

According to the present invention, there are provided a polyamide resin which comprises a molten reaction mixture composed of 10 to 90% by weight of a polyamide (A1) prepared from xylylenediamine and a $C_6$–$C_{20}$ α,ω-linear aliphatic dibasic acid and 90 to 10% by weight of polyamide-6 (A2), and which is characterized in that it has either a single glass transition temperature differing from that of both (A1) and (A2), or has two glass transition temperatures differing from that of both (A1) and (A2), the difference between the two temperatures being less than 10° C.; and a roughened polyamide resin composition comprising 100 parts by weight of (A) above polyamide resin and 5 to 80 parts by weight of (B) an elastomer composed mainly of a block copolymerized elastomer which has been modified with an unsaturated dicarboxylic acid or a derivative thereof and hydrogenated.

DESCRIPTION OF THE PREFERRED EMBODIMENT

Polyamide Resin (A)

Figure 1:
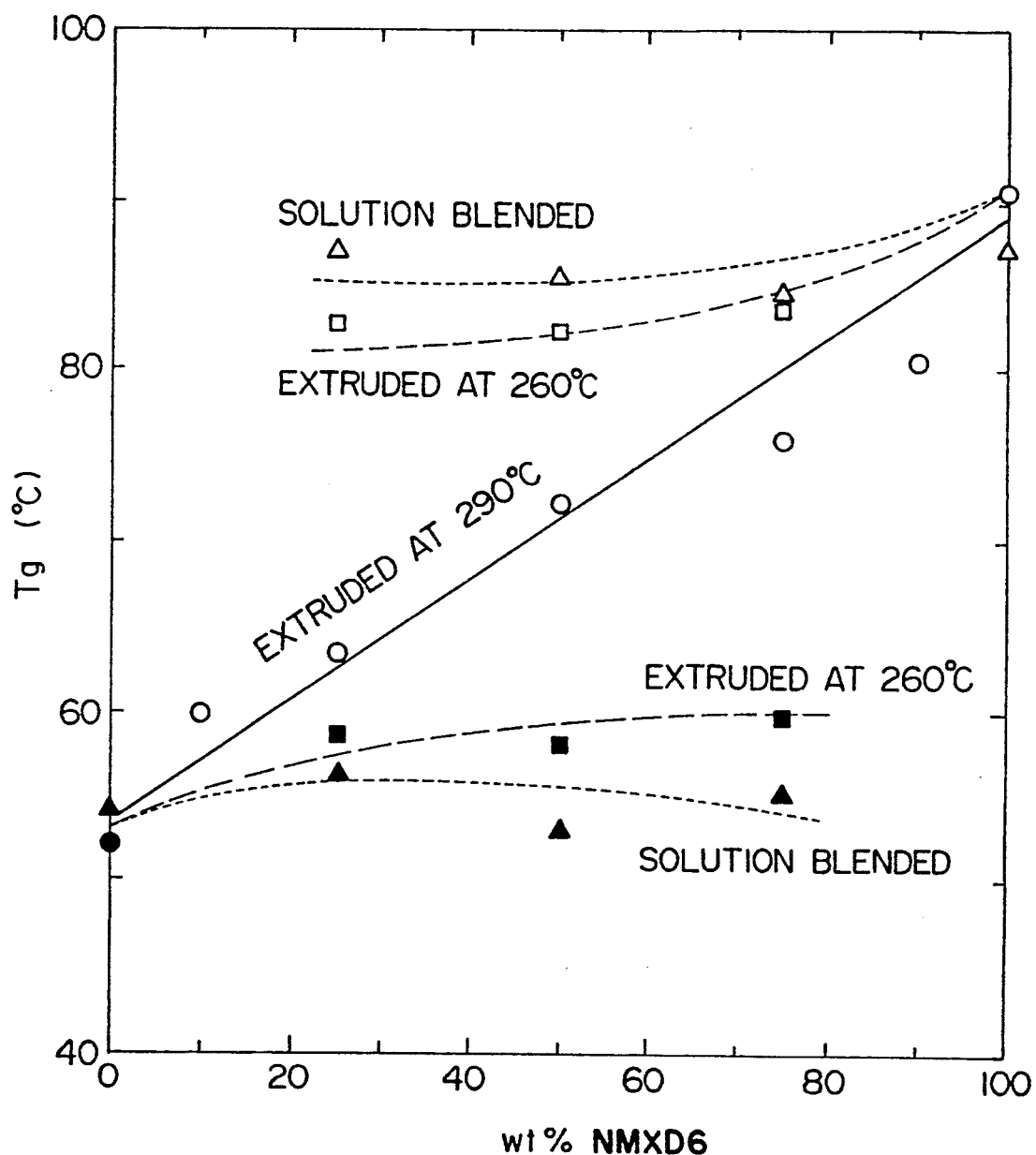

The polyamide resin (A) of this invention is composed of a molten reaction mixture obtained by melting MX nylon (A1) and polyamide-6 (A2) under specific (temperature and time) conditions to cause their reaction, said resin having a specific glass transition temperature or temperatures.

The reactions that progress under the molten condition are mainly of the following 1)–3) types.

Acidolysis:

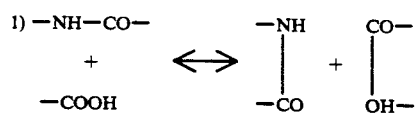

Aminolysis:

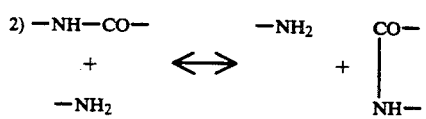

Amidolysis:

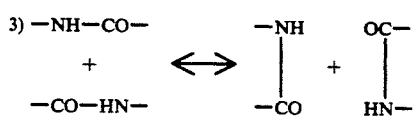

State of progress of above reaction can be known from NMR absorption spectrum. The progress of the reaction in the molten condition can be also known by measuring the glass transition temperature of the polyamide resin which is the reaction mixture in molten state.

With progress of the reaction, the difference in glass transition temperatures of MX nylon and polyamide-6 becomes increasingly less and at a certain point of time the mixture comes to have a single glass transition temperature.

The polyamide resin (A) obtained through the reaction in molten state exhibits improved heat resistance, dimensional stability and mechanical properties such as modulus of elasticity and yield stress.

Polyamide resin (A) of the present invention is obtained through the above-described reaction. As the reaction between MX nylon and polyamide-6 progresses, ultimately the reaction mixture comes to show a single glass transition temperature as aforesaid. The polyamide resin (A) of the present invention includes not only the product in so advanced stage of the reaction that it has a single glass transition temperature but also those at earlier stages of the reaction having two glass transition temperatures, provided the difference between the two temperatures is less than 10° C. Such polyamide resins (A) commonly exhibit satisfactorily improved mechanical properties such as impact strength.

Polyamide resin (A) of the present invention can be used as a molding resin upon blending it with fillers such as glass fiber, glass beads, calcium carbonate, mica, potassium titanate, carbon fiber, etc.

A) MX Nylon

The polyamide resin (A1) composed of xylylenediamine and α,ω-linear aliphatic dibasic acid, viz., MX nylon, to be used in the present invention includes polyamide resins formed by polycondensation of, as the diamine component, metaxylylenediamine alone or a xylylenediamine mixture of at least 60% by weight of metaxylylenediamine and not more than 40% by weight of paraxylylenediamine with, as the acid component, an α,ω-linear aliphatic dibasic acid having 6 to 20 carbon atoms, preferably 6 to 12 carbon atoms, such as adipic acid, sebacic acid, suberic acid, dodecanedioic acid and eicodioic acid, adipic acid being the most preferred.

Preferably, the MX nylon has a number average molecular weight of 10,000 to 50,000, especially 14,000 to 25,000.

B) Polyamide-6

Polyamide-6 (A2) to be used in combination with MX nylon according to this invention is a ring-opening polymer of caprolactam preferably having a number average molecular weight of 10,000 to 50,000, particularly 14,000 to 30,000.

C) Mixing Proportions of MX Nylon and Polyamide-6

Based on the total weight of the MX nylon and the polyamide-6, the amount of MX nylon is 10 to 90% by weight, preferably 20 to 80% by weight, and the amount of the polyamide-6 is 90 to 10% by weight, preferably 80 to 20% by weight. The resin composition for molding comprising these components at the aforesaid proportion has excellent impact strength.

D) Reaction of MX Nylon with Polyamide-6 in Molten Condition

If MX nylon and polyamide-6 are dry-blended under ordinary conditions and melt-kneaded, the resultant polyamide resin mixture becomes a pearl-colored, non-transparent composition because MX nylon and polyamide-6 are not easily compatible with each other.

However, polyamide resin (A) obtained through the reaction in molten state according to the present invention is a product of a reaction in the molten state of MX nylon and polyamide-6 at a specific temperature for a specific time. The product is in relatively advanced stage of the reaction and exhibits improved mechanical characteristics.

For example, through the steps of dry-blending 50 parts by weight of polymetaxylylene adipamide as MX nylon with 50 parts by weight of polyamide-6 and melt-kneading the blend in the cylinder of an injection-molding machine at 260° C. for 30 minutes or at 290° C. for 3 minutes, a polyamide resin having a single glass transition temperature differing from that of either of polymetaxylylene adipamide and polyamide-6 can be obtained.

When the reaction in molten state is further advanced, the (single) glass transition temperature gradually shifts to lower side, with which heat resistance of the resin tends to gradually decrease. Hence, it is preferable that the polyamide resin (A) having improved mechanical properties of the present invention has a single glass transition temperature which is not lower than its initial single glass transition temperature (Tg1) by 5° C. or more.

Polyamide Resin Composition

The polyamide resin composition of the present invention is prepared by blending a specific elastomer (B) with the above polyamide resin (A).

As already stated, the polyamide resin (A) exhibits improved heat resistance, dimensional stability and mechanical properties. By blending such polyamide resin (A) with a specific elastomer, state of dispersion of the elastomer can be drastically improved compared to the cases of blending the elastomer with MX nylon or polyamide-6 alone, or with a simple blend of those two polyamides, and a composition of markedly improved impact strength can be obtained.

The polyamide resin composition of the present invention excels in heat stability as well as in resistance to thermal deformation, impact resistance and rigidity at well-balanced proportions, and is useful as an industrial material in electronic and electric fields as well as that for automobiles.

According to the present invention, the elastomer to be blended with the polyamide resin (A) is, for example, an elastomer selected from the group consisting of a copolymer derived from unsaturated compounds such as olefins, dienes and vinyl aromatic compounds, an ionomer, i.e. a metal salt of a copolymer of an ethylenic compound and an unsaturated dicarboxylic acid, and a block copolymerized elastomer. These elastomer may have been modified with an unsaturated dicarboxylic acid or a derivative thereof and/or hydrogenated.

Of these elastomers, those preferred as a toughener to be blended with the polyamide resin (A) of the present invention are the block copolymerized elastomers composed of polymer blocks (B1) consisting essentially of vinyl aromatic compound units and polymer blocks (B2) consisting essentially of conjugated diene compound units, which have been modified with unsaturated dicarboxylic acids or derivatives thereof and hydrogenated.

A) The Polymer Block (B1) Consisting Chiefly of Vinyl Aromatic Compound Units The vinyl aromatic compounds constituting the polymer block (B1) include those expressed by the following formula:

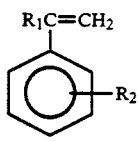

in which $R_1$ and $R_2$ represent independently from each other a hydrogen atom or a $C_1$–$C_5$ alkyl group. Specifically, styrene, α-methylstyrene, vinyltoluene, p-tert.-butylstyrene, etc. may be named, styrene being the most preferred.

These vinyl aromatic compounds may be used alone or in combination of more than one.

The polymer block (B1) may be of a homopolymer of the above vinyl aromatic compound or compounds only, while it may also contain a minor amount, e.g., up to 30% by weight of the polymer block (B1), of other monomeric units such as of ethylene, propylene or butadiene.

The polymer block (B1) can preferably have a number average molecular weight of 4,000–115,000, inter alia, 5,000–15,000.

B) The Polymer Block (B2) Consisting Chiefly of Conjugated Diene Compound Units The polymer block (B2) may consist of conjugated diene compound units only, or may be a copolymer of a major amount of conjugated diene compound units and a minor amount of olefin units.

The conjugated diene compounds include those expressed by the following formula:

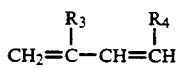

in which $R_3$ and $R_4$ represent independently from each other a hydrogen atom or a $C_1$–$C_5$ alkyl group. Specifically, butadiene, isoprene, 1,3-pentadiene and 2,3-dimethyl-1,3-butadiene may be named by way of examples, of which butadiene and isoprene are the most preferred.

Those conjugated diene compounds can be used either alone or in combination of more than one.

Examples of other olefins which can be copolymerized with above conjugated diene compound or compounds include α-olefins having 2 to 10 carbon atoms, preferably 2 to 5 carbon atoms, such as ethylene, propylene, isobutylene, and 1-pentene.

The molecular weight of polymer block (B2) is not critical, which is preferably within the range of 20,000–450,000, preferably 25,000–100,000, as number average molecular weight.

Block Copolymer

The sequence of arranging the blocks (B1) and (B2) in the block copolymer (B) is optional. For example, the following sequences may be employed: (B1)–(B2), (B1)–(B2)–(B1), (B2)–(B1)–(B2), (B1)–(B2)–(B1)–(B2), (B1)–(B2)–(B1)–(B2)–(B1), (B2)–(B1)–(B2)–(B1)–(B2).

The copolymers may be composed of mixtures of these sequences.

In the present invention, particularly (B1)–(B2)–(B1) type block copolymers are preferred.

The ratio of the block (B1) to block (B2) in the block copolymer is not critical, but is variable over a wide range. Preferably the weight ratio of block (B1) to block (B2) is within the range of from 15/85 to 60/40, more preferably from 20/80 to 50/50, inter alia, from 20/80 to 40/60.

Such block copolymers can be prepared by the methods known per se.

The block copolymers may be subjected to modification with an unsaturated dicarboxylic acid or derivatives thereof and/or hydrogenation.

The order of performing these two treatments is optional, but normally the hydrogenation is conveniently conducted prior to the modification.

The preferred unsaturated dicarboxylic acids used to modify the block copolymer are those containing 4 to 16 carbon atoms, particularly 4 to 9, e.g., maleic, fumaric, itaconic, citraconic, cis-4-cyclohexane-1,2-dicarboxylic and endo-cis-bicyclo-[2,2,1]-5-heptene-2,3-dicarboxylic acids. Useful derivatives of these acids may be their anhydrides. Of these, particularly maleic anhydride is preferred.

Modification of the block copolymers with these unsaturated dicarboxylic acids or their derivatives can be effected by the methods known per se. For example, it can be conducted by performing an addition reaction of such an unsaturated dicarboxylic acid or a derivative thereof to the block copolymer in solution or in molten state in the presence or absence of a radical initiator.

The amount of the unsaturated dicarboxylic acid or its derivative to be added to the block copolymer is generally 0.01 to 10 parts by weight, preferably 0.1 to 5 parts by weight, especially 0.1 to 3 parts by weight, per 100 parts by weight of the copolymer.

The block copolymer which has been modified as above is also hydrogenated by known methods. The degree of hydrogenation is such that at least 70%, preferably at least 80%, of the aliphatic double bonds present in the copolymer block (B2) are hydrogenated.

The modified and hydrogenated elastomer imparts excellent weatherability to the polyamide resin composition of the present invention.

It is possible that accompanying the above hydrogenation, a part of the aromatic double bonds in the polymer block (B1) are also hydrogenated. In this case, the amount of hydrogenated aromatic double bonds should desirably be controlled so as to be 20% or below, more preferably 10% or below, based on the total amount of aromatic double bonds present. Determination of aliphatic and aromatic double bonds can be conducted by means of instrumental analysis such as infrared absorption spectrum (IR) or chemical analysis such as iodometry.

The modified and hydrogenated block copolymer obtained as above may have a number average molecular weight of preferably 25,000 to 200,000, particularly 30,000 to 150,000.

The modified and hydrogenated block copolymers to be used in the present invention may include those commercially available, for example, "KRATON® FG1901X" of Shell Chemical Co., Ltd.

Preparation of the Polyamide Resin Composition of the Present Invention

The polyamide resin composition of the present invention can be prepared by, for example, melt-kneading the polyamide resin (A) obtained by reacting MX nylon with polyamide-6 in molten state, with the modified and hydrogenated block copolymer, viz., the elastomer (B).

As an alternative method, the composition can be prepared through the steps of first melt-kneading the polyamide (A1) with the elastomer (B) and then melt-kneading the resulting composition with polyamide-6 (A2); or conversely, first melt-kneading polyamide-6 (A2) with the elastomer (B) and then melt-kneading the resulting composition with the polyamide (A1).

The modified and hydrogenated block copolymerized elastomer is blended with the molten reaction product of MX nylon with polyamide-6, viz., the polyamide resin (A), at a ratio of 5-80 parts, preferably 10-50 parts, inter alia, 15-40 parts, per 100 parts of the molten reaction product, the parts being by weight, whereby to drastically improve impact strength and other properties of the polyamide resin composition.

If required, the polyamide resin composition of the present invention may further be blended with polyamide-66, which contributes to improve moldability of the polyamide resin composition of the present invention, whereby shortening the cycle time in molding operation.

Preferred amount of the polyamide-66 to be blended is 1-30 parts, more preferably 3-15 parts, per 100 parts of MX nylon, the parts being by weight.

To the polyamide resin composition of this invention, still other additives such as stabilizers against degradation by oxidation, heat or ultraviolet rays, nucleating agent, plasticizer, releasing agent, fire retardant, antistatic agent, lubricant, etc. may be suitably blended.

The polyamide resin composition of this invention can be prepared by melt-kneading the polyamide or polyamide composition with the modified hydrogenated block copolymerized elastomer in, for example, a twin-screw extruder at a temperature higher than the melting point or flow-initiating point of the polyamide or polyamide composition by 5° to 50° C.

The polyamide resin composition prepared in accordance with the present invention excels particularly in impact strength, and exhibits high thermal stability during processing, mechanical strength, chemical resistance, rigidity, etc. It is therefore extremely useful for automobile, electrical and electronical applications.

Hereinafter the present invention will be more specifically explained with reference to the working and control examples.

EXAMPLES and CONTROLS

1) Resin Used

① Poly(metaxylylene adipamide) (hereinafter will be referred to as "NMXD6"): MX Nylon 6007, a product of Mitsubishi Gas Chemical Company, Inc.; average molecular weight, 25,300

② Polyamide-6: "CAPLON® 8207 F", a product of Allied-Signal Co.; average molecular weight, 25,000

③ Styrene.ethylene/butylene.styrene block copolymer: "KRATON® FG1901X", a product of Shell Chemical Co., Ltd.

2) Methods of Blending NMXD6 with Polyamide-6

① Melt-Mixing Method-1

NMXD6 and polyamide-6 at a prescribed ratio were mixed in a tumbler, melt-kneaded in a twin-screw extruder at 290° C. for 3 minutes to obtain a blend. The resultant blend was dried in vacuum at 80° C. for at least 12 hours.

② Melt-Mixing Method-2

After mixing the two components in the manner similar to above, the resultant mixture was melt-kneaded at 260° C. for 3 minutes to obtain a blend. The blend was dried in the same manner as above.

③ Solution Method

NMXD6 and polyamide-6 at a prescribed ratio were dissolved in trifluoroethanol solvent, coprecipitated in diethylether, and the resulting coprecipitate was dried in vacuum at 80° C. for at least 12 hours. (The injection molding machine used in the occasion of above melt-kneading in ① and ② above was Allrunder 305-210-700 manufactured by ARBURG.)

3) Thermal Analysis

DSC process was employed. The instrument used was DSC-7 manufactured by Perkin Elmer Co.

4) Evaluation of Mechanical Properties

| | |
|---|---|
| Modulus of elasticity: | ASTM D638 |
| Yield stress: | ASTM D638 |
| Elongation at break: | ASTM D638 |
| Izod impact strength: | ASTM D256 (⅛ in. notched) |

EXAMPLE 1

By means of DSC process, glass transition temperatures of the polyamide resins obtained through the above various blending methods were measured.

The instrument used for the measurement:
DSC-7 manufactured by Perkin Elmer Co.

The results of the measurements are shown in Table 1. The results in Table 1 are illustrated in FIG. 1.

TABLE 1

| | Glass Transition Temperatures | | | | |
|---|---|---|---|---|---|
| NMXD6 (wt./%) | Melt-mixing method-1 (°C.) | Melt-mixing method-2 (°C.) | | Solution method (°C.) | |
| 0 | 52.2 | 52.2 | — | 54.3 | — |
| 25 | 63.4 | 58.5 | 82.5 | 56.4 | 87.0 |
| 50 | 72.2 | 58 | 82 | 53 | 85.5 |
| 75 | 75.8 | 59.5 | 83.3 | 55 | 84.6 |
| 100 | 90.3 | — | 90.3 | — | 87.1 |

EXAMPLE 2

Equal amounts of NMXD6 and polyamide-6 were mixed by the solution method to provide test samples, which were heat-treated at 260° C. in DSC for 0, 15, 30, 60 and 120 minutes. After cooling, their DSC diagrams were measured while heating them from 40° C. to 120° C. The resultant diagrams are shown in FIG. 2.

Figure 2:
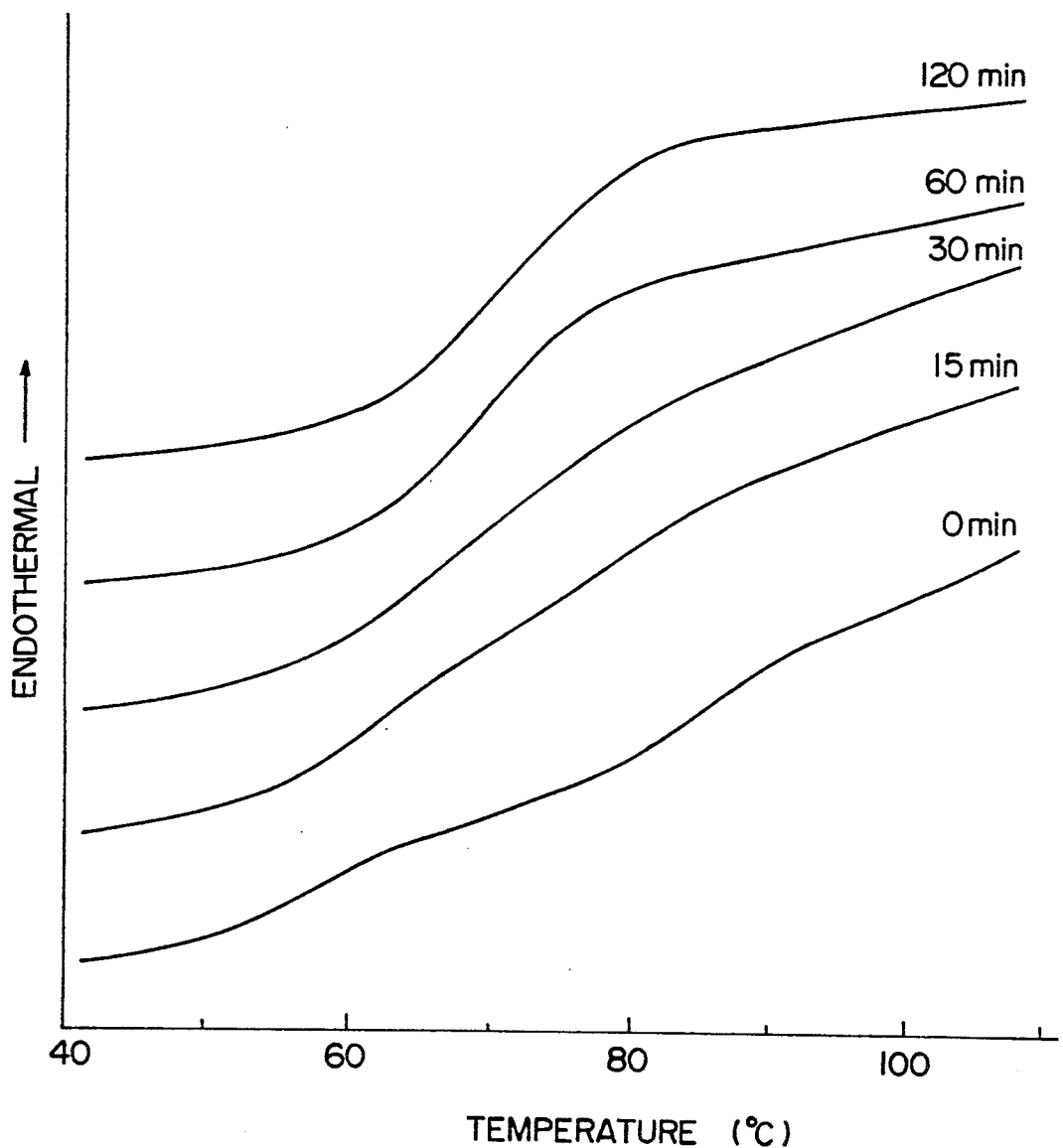

From FIG. 2 it can be seen that the samples which were heat-treated at 260° C. for 0 minute and 15 minutes had two glass transition temperatures because the molten reaction has not yet sufficiently progressed. Whereas, the samples which were heat-treated for 30 minutes or longer came to have single glass transition temperature, indicating that the molten reaction has considerably progressed.

EXAMPLE 3

A 50:50 (by volume) mixture of NMXD6 and polyamide-6 was melt-kneaded, and the relation of the Tg to the annealing time was obtained, using a temperature as a parameter.

The samples were prepared by the solution method free of thermal treatment, at NMXD6/polyamide-6=50/50. The annealing was conducted with the use of DSC.

The results are shown in FIG. 3.

From FIG. 3 it can be understood that the higher the annealing temperature the shorter the time required for the reaction product to come to have a single glass transition temperature. It can also be understood that the single glass transition temperature varies as the annealing time is prolonged.

EXAMPLE 4

NMXD6 and polyamide-6 were blended at prescribed ratios and melt-kneaded at 290° C. for 3 minutes to be given a homogeneous phase to provide samples of first group. Same samples were further heat-treated (100° C., 18 hrs.) to provide samples of second group. Their mechanical strength properties (modulus of elasticity and yield stress) and elongation at break were measured.

The results are shown in Table 2 below.

TABLE 2

| | Example No. | | | | |
|---|---|---|---|---|---|
| | 4-1 | 4-2 | 4-3 | 4-4 | 4-5 |
| Blend ratio | | | | | |
| NMXD6 wt. % | 0 | 25 | 50 | 75 | 100 |
| polyamide-6 wt. % | 100 | 75 | 50 | 25 | 0 |
| Modulus of elasticity (Kpsi) | | | | | |
| heat-treated | 385 | 365 | 421 | 525 | 565 |
| not heat-treated | 383 | 368 | 413 | 469 | 516 |
| Yield stress (Kpsi) | | | | | |
| heat-treated | 12.0 | 11.9 | 14.2 | 17.7 | 18.8 |
| not heat-treated | 12.8 | 10.9 | 11.8 | 12.2 | 15.4 |
| Elongation at break (%) | | | | | |
| heat-treated | 179 | 134 | 97 | 16 | 10 |
| not heat-treated | 298 | 244 | 198 | — | 45 |

As should be clear from Table 2, modulus of elasticity and yield stress are increased by the heat treatment, but the influence of the heat treatment decreases with increase of polyamide-6 concentration.

Whereas, the elongation at break shows a tendency to be reduced by the heat treatment.

These effects are considered to be attributable to the low crystallinity of NMXD6 immediately after molding.

EXAMPLE 5

Prescribed amounts of NMXD6 and polyamide-6 were mixed in a tumbler and melt-kneaded in a twin-screw extruder at 290° C. for 3 minutes to provide pelletized molding materials.

The materials were blended with a prescribed amount of maleic anhydride-modified and hydrogenated styrene.ethylene/butylene.styrene block copolymer (KRATON® FG1901X, a product of Shell Chemical Co., Ltd.) and melt-kneaded at 260° C. in the manner similar to above to provide pelletized molding materials.

The molding materials were injection-molded at 260° C. to provide samples for evaluation tests, which were subsequently heat-treated (100° C., 18 hours) and given the evaluation tests.

The results are collectively shown in Tables 3 and 4.

With the increased in the amount of KRATON® FG1901X (MA-SEBS), the modulus of elasticity and yield stress somewhat decreased, but Izod impact strength showed remarkable improvement.

TABLE 3

| | Modulus of elasticity (kg/cm$^2$) | | | Yield stress (kg/cm$^2$) | | |
|---|---|---|---|---|---|---|
| MA-SEBS concentration in the composition | 0 | 10 | 20 | 0 | 10 | 20 |
| NMXD6 concentration in the polyamide resin (wt. %) 0 | | 26900 | 23600 | 19000 | 840 | 700 | 570 |
| 10 | — | 23500 | 19700 | — | 690 | 560 |
| 25 | 25700 | 22600 | 19200 | 830 | 710 | 570 |
| 50 | 29600 | 24000 | 18500 | 1000 | 750 | 620 |
| 75 | 37000 | 28100 | 22200 | 1240 | 870 | 710 |
| 100 | 39800 | 34500 | 27400 | 1320 | 1060 | 850 |

TABLE 4

| | Elongation at break (kg/cm$^2$) | | | Izod impact strength (kg/cm$^2$) | | |
|---|---|---|---|---|---|---|
| MA-SEBS concentration in the composition | 0 | 10 | 20 | 0 | 10 | 20 |
| NMXD6 concentration in the polyamide resin (wt. %) 0 | 179 | — | 158 | 4 | 13 | 32 |
| 10 | — | 178 | 113 | — | 23 | 149 |
| 25 | 134 | 156 | 167 | 3 | 21 | 139 |
| 50 | 97 | 120 | 158 | 3 | 14 | 100 |
| 75 | 16 | 26 | 76 | 2 | 8 | 41 |
| 100 | 10 | 8 | 11 | 2 | 4 | 8 |

EXAMPLE 6

In order to investigate the state of dispersion of the elastomer particles in the polyamide resin composition of the present invention, the following components at the ratios specified in the table below were melt-kneaded (290° C., 3 min.) to form each a molten mixture having a single glass transition temperature (having a homogeneous phase) and micrographs of the molded article, which was molded from the molten mixture, were taken.

| | Blend ratio (part by weight) | | | | |
|---|---|---|---|---|---|
| Component | 6-1 | 6-2 | 6-3 | 6-4 | 6-5 |
| Polyamide-6 | 80 | 60 | 40 | 20 | 0 |
| NMXD6 | 0 | 20 | 40 | 60 | 80 |
| Elastomer | 20 | 20 | 20 | 20 | 20 |
| Sample No. | N100R20 | N75R20 | N50R20 | N25R20 | N0R20 |

From the cross-section perpendicular to the sample flow direction at the central part of each test piece (14×3×140 mm) an about 0.1 μm-thick slice was cut off and photographed with a transmission-type electron microscope.

The transmission-type electron microscope employed:

JEM-2000FX, manufactured by Nihon Denshi K.K.

Measuring condition: Accelerating voltage: 200 kv

The micrograph of Sample No. N100R20 shows that the elastomer particles having a diameter of about 0.1 μm are homogeneously dispersed. In the micrographs of Samples Nos. N75R20 and N50R20, it is seen that the most of the dispersed elastomer particles have spherical shape having a diameter of about 0.1 to 0.3 μm or indefinite shape. Further, in the micrographs of Samples Nos. N25R20 and N0R20, it is observed that the most of the dispersed elastomer have a spherical shape having a diameter of about 0.2 to 0.6 μm and as particles of indefinite shape.

What is claimed is:

1. A polyamide resin which comprises the product of a molten reaction of a mixture composed of 10–90% by weight of a polyamide (A1) from xylylenediamine and a $C_6$–$C_{20}$ α,ω-linear aliphatic dibasic acid and 90–10% by weight of polyamide-6 (A2), and which has either
   a single glass transition temperature differing from that of both (A1) and (A2), or
   two glass transition temperatures both differing from those of (A1) and (A2), the difference between the two temperatures being less than 10° C., (the glass transition temperature being measured by DSC process at a temperature rise rate of 20° C./min).

2. The polyamide resin of claim 1 in which the $C_6$–$C_{20}$ α,ω-linear aliphatic dibasic acid in the polyamide (A1) is adipic acid.

3. The polyamide resin of claim 1 in which the polyamide (A1) has a number average molecular weight of between 10,000 and 50,000.

4. The polyamide resin of claim 1 in which the polyamide-6 (A2) has a number average molecular weight of between 10,000 and 50,000.

5. The polyamide resin of claim 1 in which the molten reaction mixture comprises 20–80% by weight of polyamide (A1) and 80–20% by weight of polyamide-6 (A2).

6. The polyamide resin of claim 1 in which said single glass transition temperature or at least one of the two glass transition temperatures differing by less than 10° C. is within the range of 70°±5° C.

7. A reinforced polyamide resin composition comprising
   (A) 100 parts by weight of the polyamide resin of claim 1, and
   (B) 5 to 80 parts by weight of an elastomer.

8. The polyamide resin composition of claim 7 in which the α,ω-linear aliphatic dibasic acid in the polyamide (A1) composing the polyamide resin of claim 1 is adipic acid.

9. The polyamide resin composition of claim 7 in which the polyamide (A1) composing the polyamide resin of claim 1 has a number average molecular weight of between 10,000 and 50,000.

10. The polyamide resin composition of claim 7 in which the polyamide-6 (A2) composing the polyamide resin of claim 1 has a number average molecular weight of between 10,000 and 50,000.

11. The polyamide resin composition of claim 7 in which the molten reaction mixture composing the polyamide resin of claim 1 consists of 20–80% by weight of the polyamide (A1) and 80–20% by weight of the polyamide-6 (A2).

12. The polyamide resin composition of claim 7 in which the single glass transition temperature or at least one of the two glass transition temperatures differing by less than 10° C. of the polyamide resin of claim 1 is within the range of 70°±5° C.

13. The polyamide resin composition of claim 7 in which the elastomer, which has been modified with an unsaturated dicarboxylic acid or a derivative thereof and hydrogenated, is an elastomer composed of polymer blocks (B1) consisting essentially of vinyl aromatic compound units and polymer blocks (B2) consisting essentially of conjugated diene compound units.

14. The polyamide resin composition of claim 13 in which the vinyl aromatic compound is expressed by the formula below:

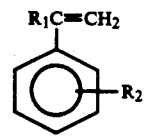

in which $R_1$ and $R_2$ represent independently from each other a hydrogen atom or a $C_1$–$C_5$ alkyl group.

15. The polyamide resin composition of claim 14 in which the vinyl aromatic compound is styrene.

16. The polyamide resin composition of claim 13 in which the conjugated diene compound is expressed by the general formula below:

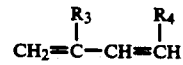

in which $R_3$ and $R_4$ represent independently from each other a hydrogen atom or a $C_1$–$C_5$ alkyl group.

17. The polyamide resin composition of claim 16 in which the conjugated diene compound is butadiene or isoprene.

18. The polyamide resin composition of claim 16 in which the polymer block (B2) is composed of the conjugated diene compound units only.

19. The polyamide resin composition of claim 16 in which the polymer block (B2) is composed of a copolymer of a major amount of conjugated diene compound units and a minor amount of olefin units.

20. The polyamide resin composition of claim 13 in which the weight ratio of the block (B1)/block (B2) is within the range of 15/85 to 60/40.

21. The polyamide resin composition of claim 13 in which the copolymer blocks (B1) and (B2) form an A-B-A type block copolymerized elastomer.

22. The polyamide resin composition of claim 7 in which the unsaturated dicarboxylic acid is a $C_4$–$C_{16}$ unsaturated dicarboxylic acid.

23. The polyamide resin composition of claim 13 in which the derivative of an unsaturated dicarboxylic acid is maleic anhydride.

24. The polyamide resin composition of claim 7 which is composed of 100 parts by weight of the polyamide resin (A) and 10–50 parts by weight of the elastomer (B) formed chiefly of a block-copolymerized elastomer which has been modified with an unsaturated dicarboxylic acid or a derivative thereof and hydrogenated.

* * * * *